United States Patent
Maiyuran et al.

(10) Patent No.: US 9,928,076 B2
(45) Date of Patent: Mar. 27, 2018

(54) METHOD AND APPARATUS FOR UNSTRUCTURED CONTROL FLOW FOR SIMD EXECUTION ENGINE

(71) Applicant: Intel Corporation, Santa Clara, CA (US)

(72) Inventors: Subramaniam Maiyuran, Gold River, CA (US); Darin M. Starkey, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 391 days.

(21) Appl. No.: 14/498,505

(22) Filed: Sep. 26, 2014

(65) Prior Publication Data

US 2016/0092239 A1 Mar. 31, 2016

(51) Int. Cl.
| | |
|---|---|
| G06F 13/28 | (2006.01) |
| G06F 9/44 | (2006.01) |
| G06F 9/38 | (2018.01) |
| G06F 9/30 | (2018.01) |
| G06F 9/32 | (2018.01) |

(52) U.S. Cl.
CPC ........ G06F 9/3887 (2013.01); G06F 9/30054 (2013.01); G06F 9/321 (2013.01)

(58) Field of Classification Search
None
See application file for complete search history.

(56) References Cited

U.S. PATENT DOCUMENTS

| | | | |
|---|---|---|---|
| 6,438,673 B1 | 8/2002 | Jourdan et al. | |
| 6,438,674 B1 | 8/2002 | Jourdan et al. | |
| 7,253,792 B2 * | 8/2007 | Biagiotti | H04N 17/00 345/16 |
| 9,766,892 B2 * | 9/2017 | Chen | G06F 9/30058 |
| 9,767,004 B2 * | 9/2017 | Yang | G06F 11/3624 |
| 2006/0101256 A1 | 5/2006 | Dwyer et al. | |
| 2007/0157188 A1 * | 7/2007 | Jourdan | G06F 9/3802 717/159 |
| 2008/0065809 A1 | 3/2008 | Eichenberger | |
| 2009/0240931 A1 * | 9/2009 | Coon | G06F 9/30054 712/234 |
| 2011/0047348 A1 | 2/2011 | Kyo | |

(Continued)

OTHER PUBLICATIONS

Transmittal of the International Search Report and the Written Opinion of the International Searching Authority from counterpart PCT/US2015/049340 dated Jan. 4, 2016, 9 pages.

(Continued)

*Primary Examiner* — Hyun Nam
(74) *Attorney, Agent, or Firm* — Nicholson De Vos Webster & Elliott LLP

(57) ABSTRACT

An apparatus and method for a SIMD unstructured branching. For example, one embodiment of a processor comprises: an execution unit having a plurality of channels to execute instructions; and a branch unit to process unstructured control flow instructions and to maintain a per channel count value for each channel, the branch unit to store instruction pointer tags for the unstructured control flow instructions in a memory and identify the instruction pointer tags using tag addresses, the branch unit to further enable and disable the channels based at least on the per channel count value.

22 Claims, 18 Drawing Sheets

(56) References Cited

U.S. PATENT DOCUMENTS

| | | | |
|---|---|---|---|
| 2011/0093683 A1* | 4/2011 | Aurich | G06F 9/3005 712/208 |
| 2014/0075165 A1* | 3/2014 | Chen | G06F 9/322 712/233 |
| 2014/0075418 A1* | 3/2014 | Bates | G06F 8/4441 717/129 |
| 2001/0116301 | 4/2014 | Shanghai et al. | |
| 2014/0115301 A1 | 4/2014 | Sanghai et al. | |
| 2014/0201352 A1* | 7/2014 | Bates | G06F 21/54 709/224 |
| 2016/0092240 A1* | 3/2016 | Maiyuran | G06F 9/3887 712/234 |
| 2016/0179535 A1* | 6/2016 | Chen | G06F 9/30058 712/22 |

OTHER PUBLICATIONS

International Preliminary Report on Patentability for Application No. PCT/US2015/049348, dated Apr. 6, 2017, 6 pages.

* cited by examiner

METHOD AND APPARATUS FOR UNSTRUCTURED CONTROL FLOW FOR SIMD EXECUTION ENGINE

BACKGROUND

Field of the Invention

This invention relates generally to the field of computer processors. More particularly, the invention relates to an apparatus and method for performing single instruction multiple data (SIMD) unstructured branching.

Description of the Related Art

Managing control flow in single instruction multiple data (SIMD) programs is a complex problem. Traditionally, graphics processing units (GPUs) use scalar code and program routines to control instruction pointer (IP) addresses for each SIMD channel. This is inefficient both in terms of performance and power usage.

Control flow is managed on some architectures by maintaining a unique IP address for each channel. For example, when a control flow instruction is encountered, the IP of each channel is updated with a particular IP based on the predicate mask of the instruction. For each and every instruction, the execution IP is compared to the channel's IP to determine if that channel is enabled for a particular instruction at the current IP.

In addition, unstructured control flow is not currently supported in hardware for SIMD programs. Modern compilers produce unstructured SIMD program code which is traditionally converted back to structured program code by the compiler, and some optimizations are lost due to converting back to structured flow.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

Figure 1:
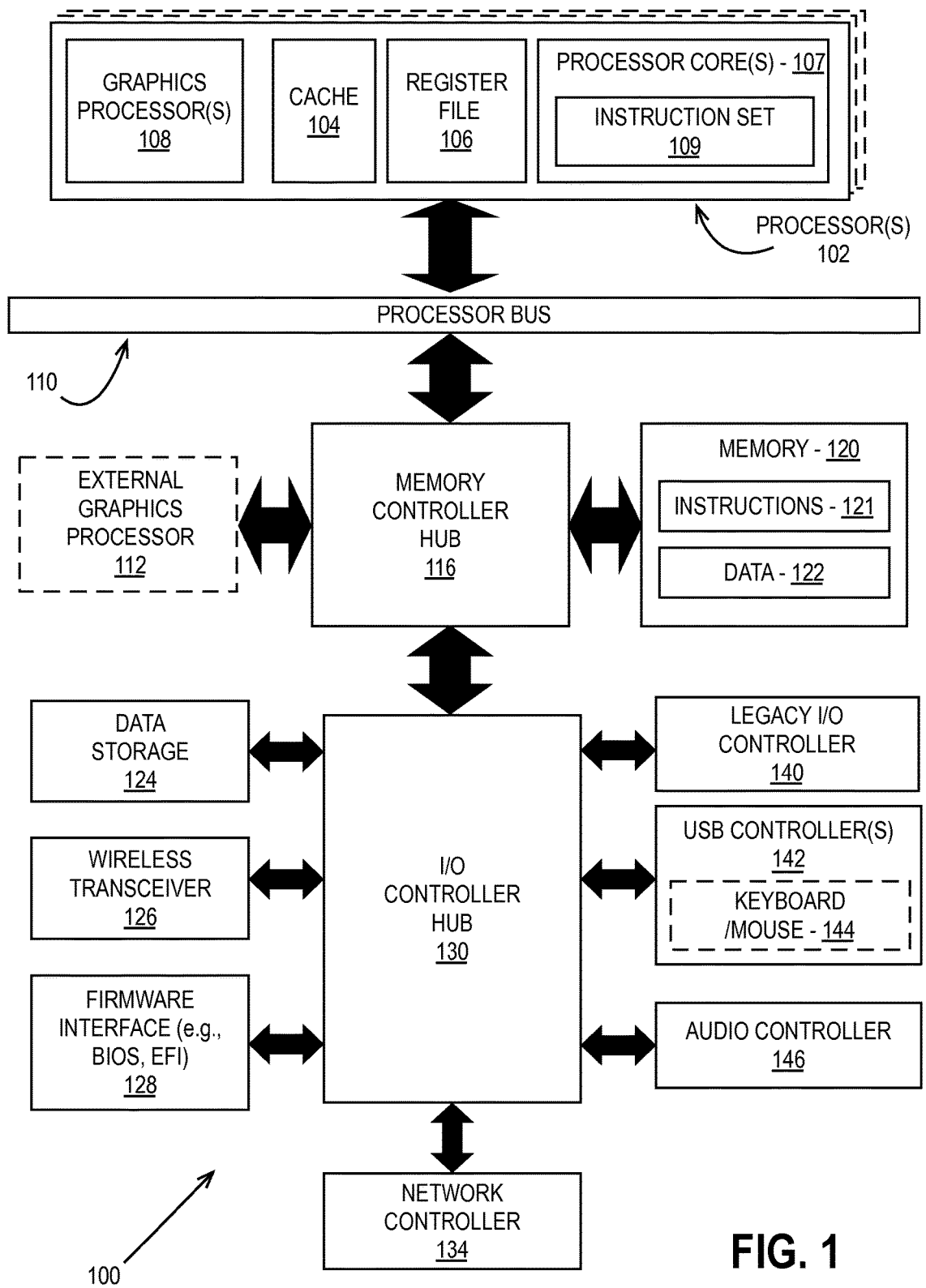
FIG. 1 is a block diagram of an embodiment of a computer system with a processor having one or more processor cores and graphics processors.
Figure 2:
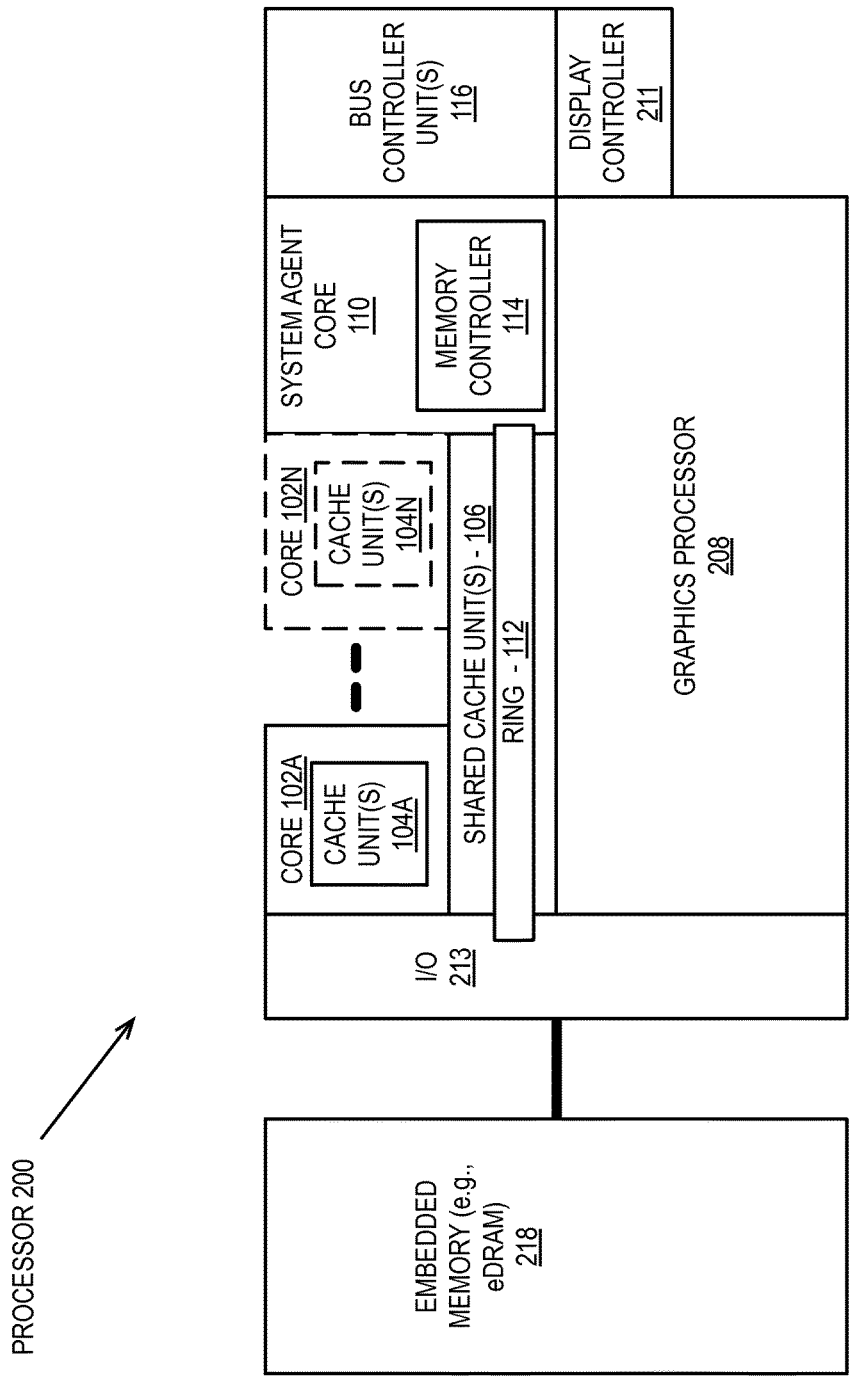
FIG. 2 is a block diagram of one embodiment of a processor having one or more processor cores, an integrated memory controller, and an integrated graphics processor.
Figure 3:
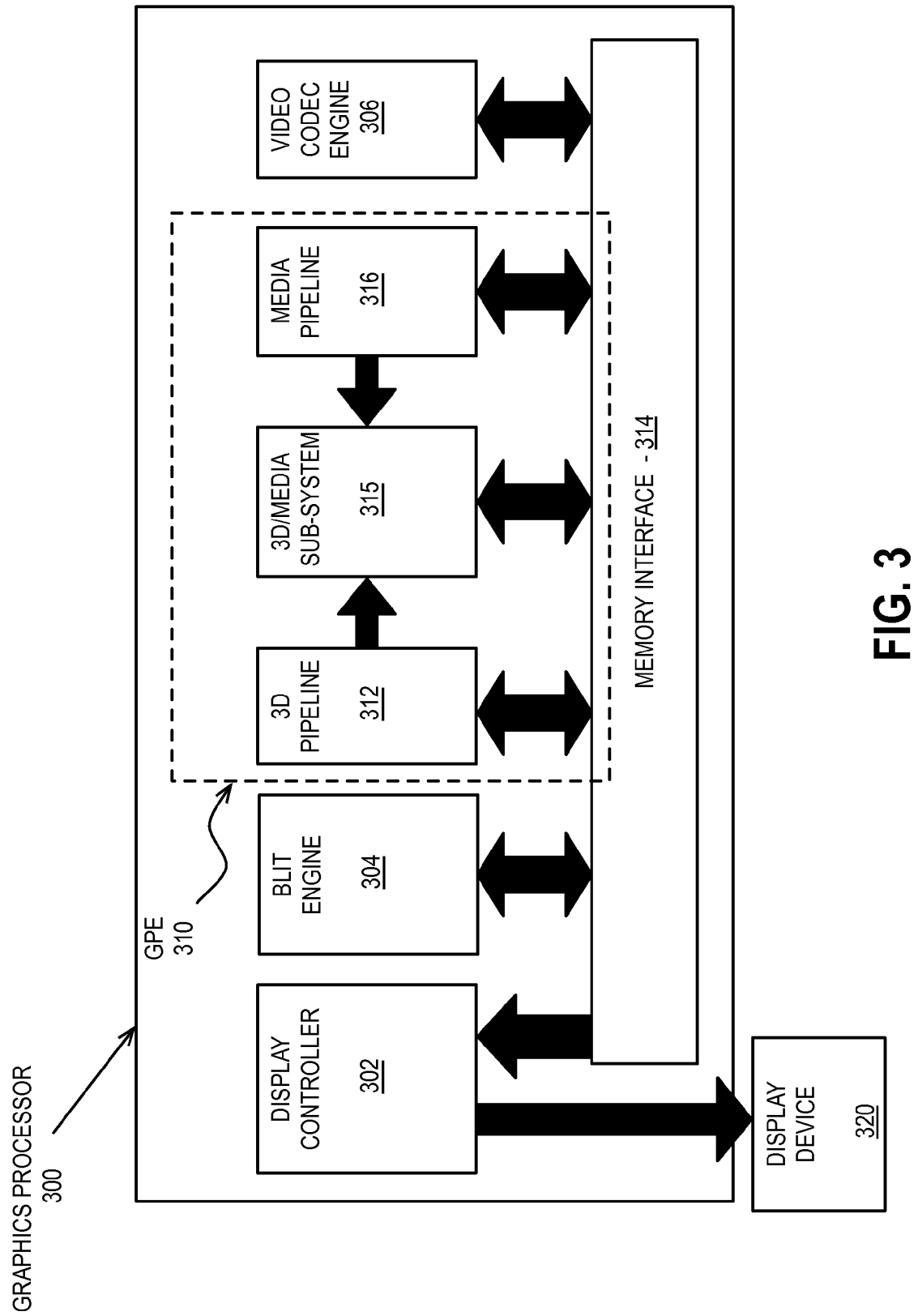
FIG. 3 is a block diagram of one embodiment of a graphics processor which may be a discreet graphics processing unit, or may be graphics processor integrated with a plurality of processing cores.

Overview—FIGS. 1-3

FIG. 1 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system on a chip integrated circuit (SOC) for use in mobile, handheld, or embedded devices.

An embodiment of the data processing system 100 can include, or be incorporated within a server-based gaming platform, a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processor 108 in the processor 102 to perform graphics and media operations.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

FIG. 2 is a block diagram of an embodiment of a processor 200 having one or more processor cores 202A-N, an integrated memory controller 214, and an integrated graphics processor 208. The processor 200 can include additional cores up to and including additional core 202N represented by the dashed lined boxes. Each of the cores 202A-N includes one or more internal cache units 204A-N. In one embodiment each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 206 and 204A-N.

The processor 200 may also include a set of one or more bus controller units 216 and a system agent 210. The one or more bus controller units manage a set of peripheral buses, such as one or more Peripheral Component Interconnect buses (e.g., PCI, PCI Express). The system agent 210 provides management functionality for the various processor components. In one embodiment, the system agent 210 includes one or more integrated memory controllers 214 to manage access to various external memory devices (not shown).

In one embodiment, one or more of the cores 202A-N include support for simultaneous multi-threading. In such embodiment, the system agent 210 includes components for coordinating and operating cores 202A-N during multi-threaded processing. The system agent 210 may additionally include a power control unit (PCU), which includes logic and components to regulate the power state of the cores 202A-N and the graphics processor 208.

The processor 200 additionally includes a graphics processor 208 to execute graphics processing operations. In one embodiment, the graphics processor 208 couples with the set of shared cache units 206, and the system agent unit 210, including the one or more integrated memory controllers 214. In one embodiment, a display controller 211 is coupled with the graphics processor 208 to drive graphics processor output to one or more coupled displays. The display controller 211 may be separate module coupled with the graphics processor via at least one interconnect, or may be integrated within the graphics processor 208 or system agent 210.

In one embodiment a ring based interconnect unit 212 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 202-N and the graphics processor 208 use the embedded memory modules 218 as shared last level cache.

In one embodiment cores 202A-N are homogenous cores executing the same instruction set architecture. In another embodiment, the cores 202A-N are heterogeneous in terms of instruction set architecture (ISA), where one or more of the cores 202A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

FIG. 3 is a block diagram of one embodiment of a graphics processor 300 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 4:
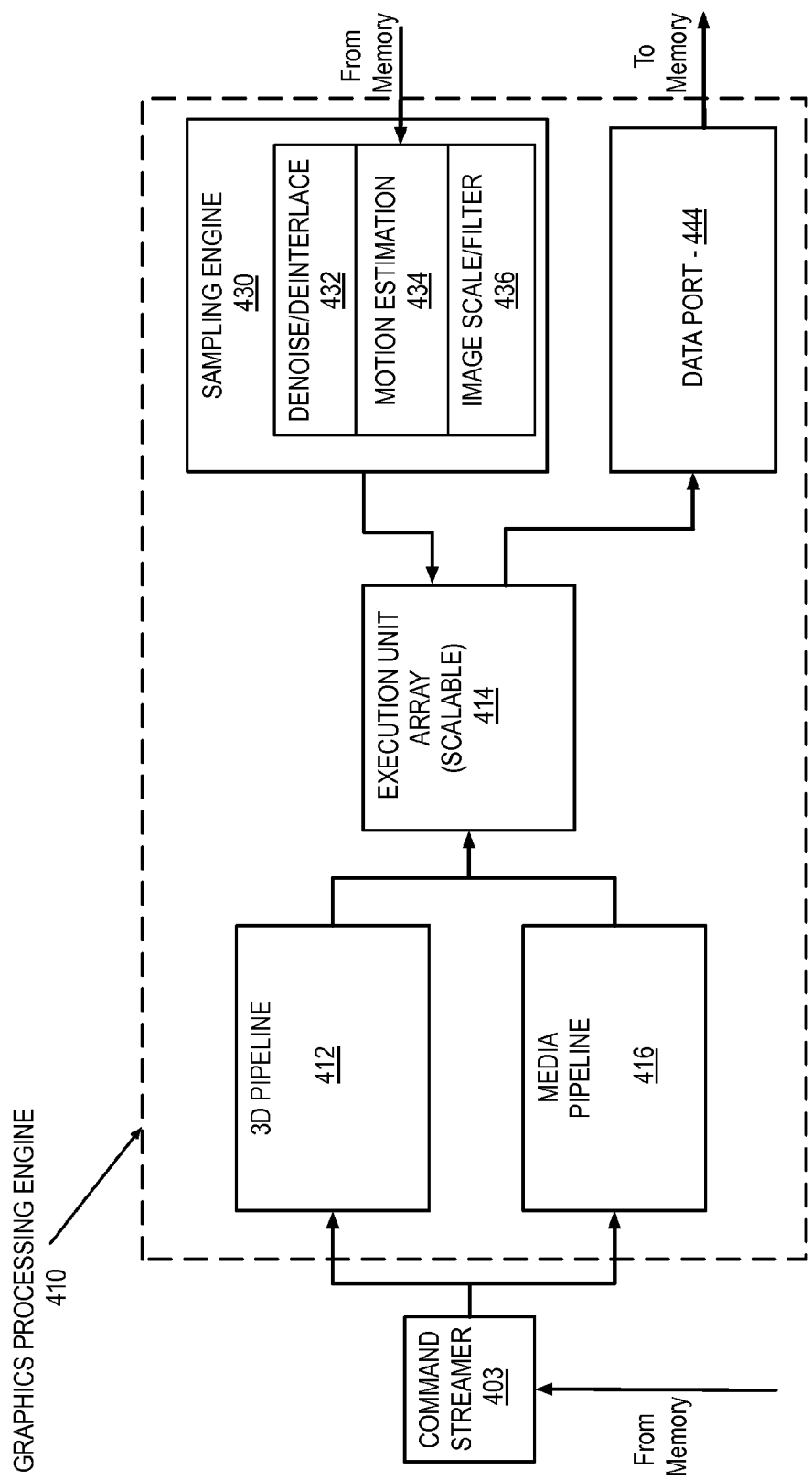
FIG. 4 is a block diagram of an embodiment of a graphics-processing engine for a graphics processor.

3D/Media Processing—FIG. 4

FIG. 4 is a block diagram of an embodiment of a graphics processing engine 410 for a graphics processor. In one embodiment, the graphics processing engine (GPE) 410 is a version of the GPE 310 shown in FIG. 3. The GPE 410 includes a 3D pipeline 412 and a media pipeline 416, each of which can be either different from or similar to the implementations of the 3D pipeline 312 and the media pipeline 316 of FIG. 3.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the sub-systems of the graphics processing engine 410.

Figure 5:
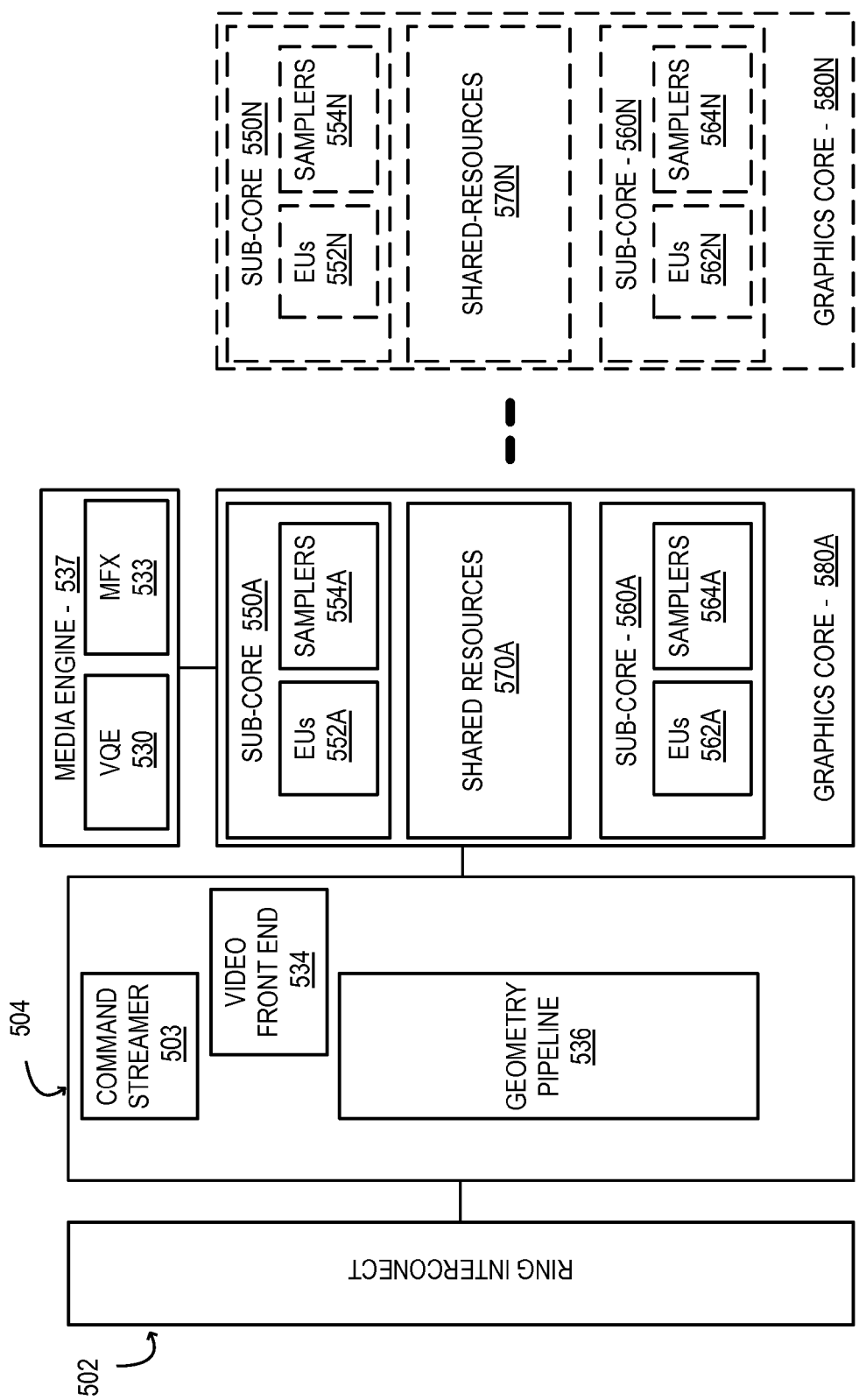
FIG. 5 is a block diagram of another embodiment of a graphics processor.
Figure 6:
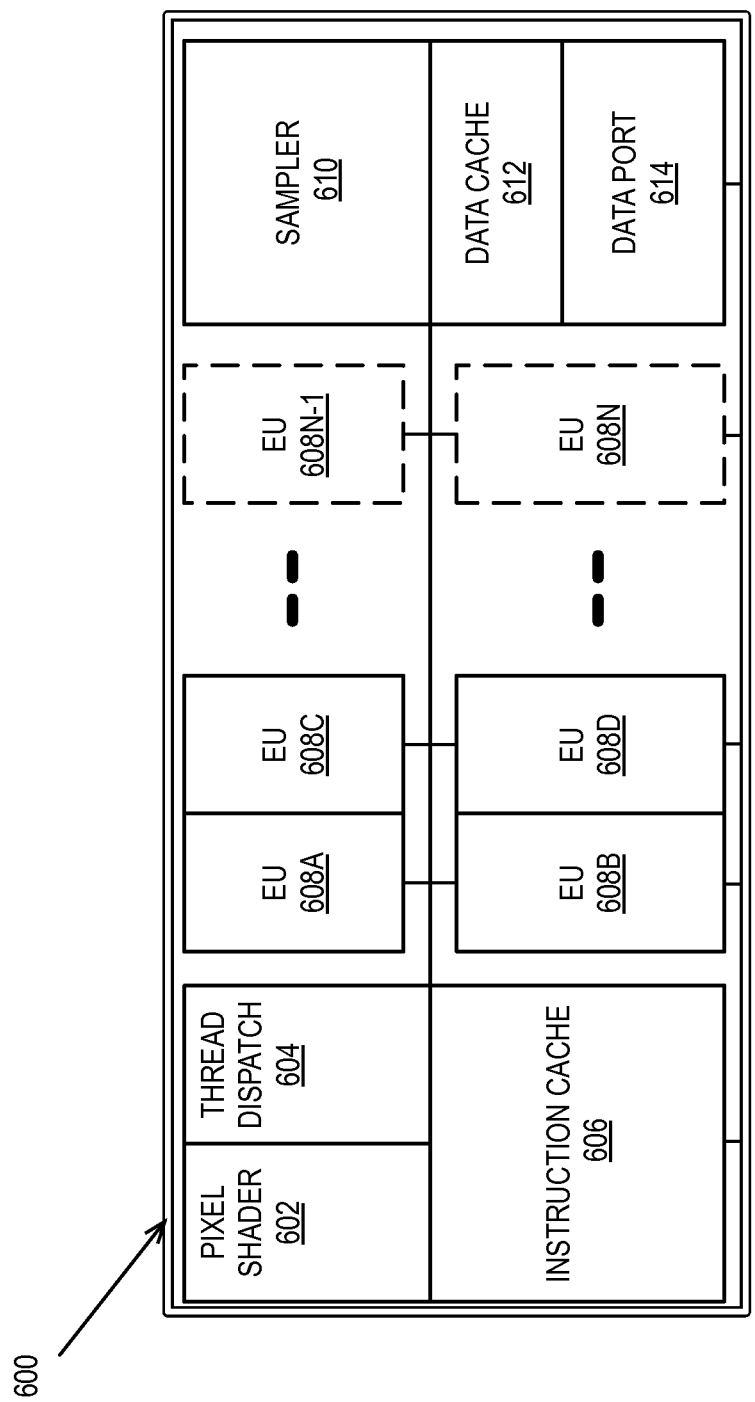
FIG. 6 is a block diagram of thread execution logic including an array of processing elements.
Figure 7:
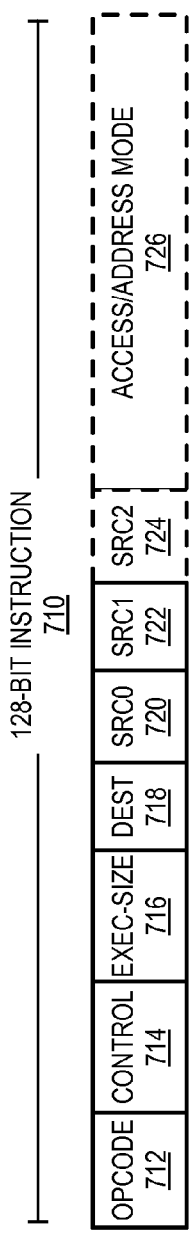
FIG. 7 illustrates a graphics processor execution unit instruction format according to an embodiment.
Figure 7:
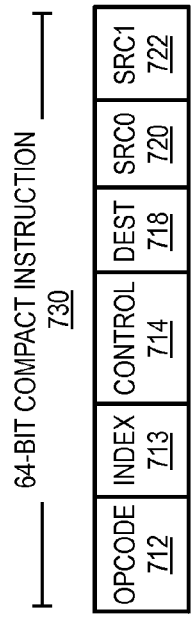
Figure 7:
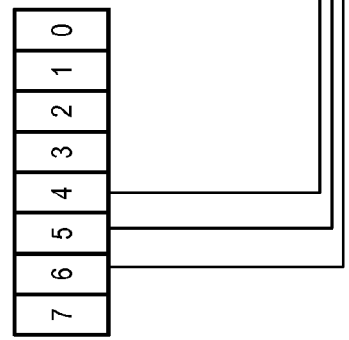

Execution Units—FIGS. 5-7

FIG. 5 is a block diagram of another embodiment of a graphics processor. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with a media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

FIG. 6 illustrates thread execution logic 600 including an array of processing elements employed in one embodiment of a graphics processing engine. In one embodiment, the thread execution logic 600 includes a pixel shader 602, a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 5) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

FIG. 7 is a block diagram illustrating a graphics processor execution unit instruction format according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 712 enables control over certain execution options, such as channels selection (e.g., predication) and data channel order (e.g., swizzle). For 128-bit instructions 710 an exec-size field 716 limits the number of data channels that will be executed in parallel. The exec-size field 716 is not available for use in the 64-bit compact instruction format 730.

Some execution unit instructions have up to three operands including two source operands, src0 722, src1 722, and one destination 718. In one embodiment, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001 xxxxb (e.g., 0x01). A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 8:
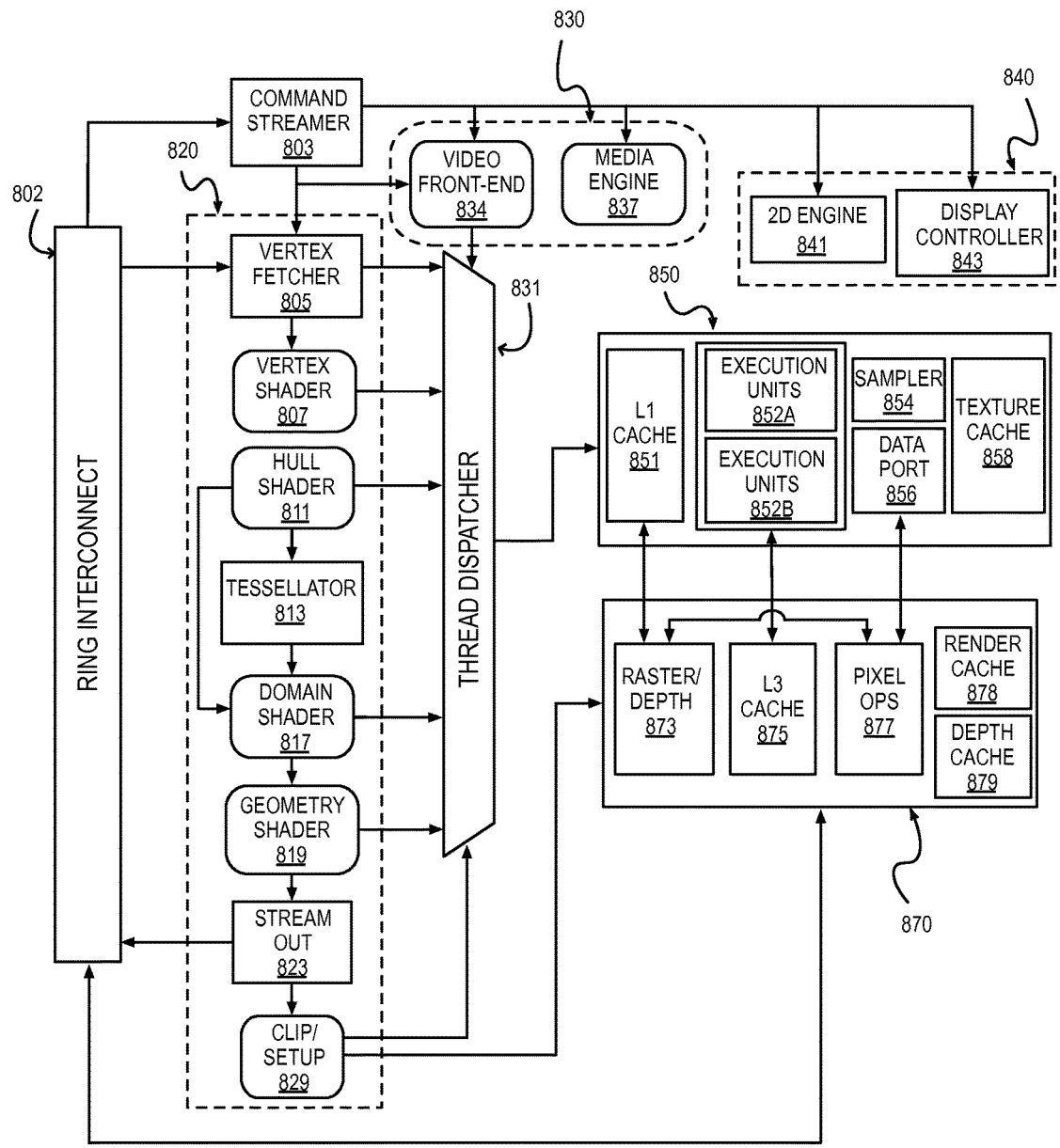
FIG. 8 is a block diagram of another embodiment of a graphics processor which includes a graphics pipeline, a media pipeline, a display engine, thread execution logic, and a render output pipeline.

Graphics Pipeline—FIG. 8

FIG. 8 is a block diagram of another embodiment of a graphics processor which includes a graphics pipeline 820, a media pipeline 830, a display engine 840, thread execution logic 850, and a render output pipeline 870. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 802. The ring interconnect 802 couples the graphics processor to other processing components, such as other graphics processors or general-purpose processors. Commands from the ring interconnect are interpreted by a command streamer 803 which supplies instructions to individual components of the graphics pipeline 820 or media pipeline 830.

The command streamer 803 directs the operation of a vertex fetcher 805 component that reads vertex data from memory and executes vertex-processing commands provided by the command streamer 803. The vertex fetcher 805 provides vertex data to a vertex shader 807, which performs coordinate space transformation and lighting operations to each vertex. The vertex fetcher 805 and vertex shader 807 execute vertex-processing instructions by dispatching execution threads to the execution units 852A, 852B via a thread dispatcher 831.

In one embodiment, the execution units 852A, 852B are an array of vector processors having an instruction set for performing graphics and media operations. The execution units 852A, 852B have an attached L1 cache 851 that is specific for each array or shared between the arrays. The cache can be configured as a data cache, an instruction cache, or a single cache that is partitioned to contain data and instructions in different partitions.

In one embodiment, the graphics pipeline 820 includes tessellation components to perform hardware-accelerated tessellation of 3D objects. A programmable hull shader 811 configures the tessellation operations. A programmable domain shader 817 provides back-end evaluation of tessellation output. A tessellator 813 operates at the direction of the hull shader 811 and contains special purpose logic to generate a set of detailed geometric objects based on a coarse geometric model that is provided as input to the graphics pipeline 820. If tessellation is not used, the tessellation components 811, 813, 817 can be bypassed.

The complete geometric objects can be processed by a geometry shader 819 via one or more threads dispatched to the execution units 852A, 852B, or can proceed directly to the clipper 829. The geometry shader operates on entire geometric objects, rather than vertices or patches of vertices as in previous stages of the graphics pipeline. If the tessellation is disabled the geometry shader 819 receives input from the vertex shader 807. The geometry shader 819 is programmable by a geometry shader program to perform geometry tessellation if the tessellation units are disabled.

Prior to rasterization, vertex data is processed by a clipper 829, which is either a fixed function clipper or a programmable clipper having clipping and geometry shader functions. In one embodiment, a rasterizer 873 in the render output pipeline 870 dispatches pixel shaders to convert the geometric objects into their per pixel representations. In one embodiment, pixel shader logic is included in the thread execution logic 850.

The graphics engine has an interconnect bus, interconnect fabric, or some other interconnect mechanism that allows data and message passing amongst the major components of the graphics engine. In one embodiment the execution units 852A, 852B and associated cache(s) 851, texture and media sampler 854, and texture/sampler cache 858 interconnect via a data port 856 to perform memory access and communicate with render output pipeline components of the graphics engine. In one embodiment, the sampler 854, caches 851, 858 and execution units 852A, 852B each have separate memory access paths.

In one embodiment, the render output pipeline 870 contains a rasterizer and depth test component 873 that converts vertex-based objects into their associated pixel-based representation. In one embodiment, the rasterizer logic includes a windower/masker unit to perform fixed function triangle and line rasterization. An associated render and depth buffer caches 878, 879 are also available in one embodiment. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In one embodiment a shared L3 cache 875 is available to all graphics components, allowing the sharing of data without the use of main system memory.

The graphics processor media pipeline 830 includes a media engine 337 and a video front end 834. In one embodiment, the video front end 834 receives pipeline commands from the command streamer 803. However, in one embodiment the media pipeline 830 includes a separate command streamer. The video front-end 834 processes media commands before sending the command to the media engine 837. In one embodiment, the media engine includes thread spawning functionality to spawn threads for dispatch to the thread execution logic 850 via the thread dispatcher 831.

In one embodiment, the graphics engine includes a display engine 840. In one embodiment, the display engine 840 is external to the graphics processor and couples with the graphics processor via the ring interconnect 802, or some other interconnect bus or fabric. The display engine 840 includes a 2D engine 841 and a display controller 843. The display engine 840 contains special purpose logic capable of operating independently of the 3D pipeline. The display controller 843 couples with a display device (not shown), which may be a system integrated display device, as in a laptop computer, or an external display device attached via an display device connector.

The graphics pipeline 820 and media pipeline 830 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 9A:
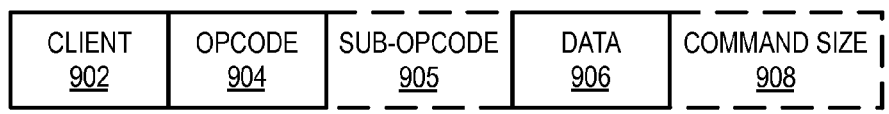
FIG. 9A is a block diagram illustrating a graphics processor command format according to an embodiment.
Figure 9B:
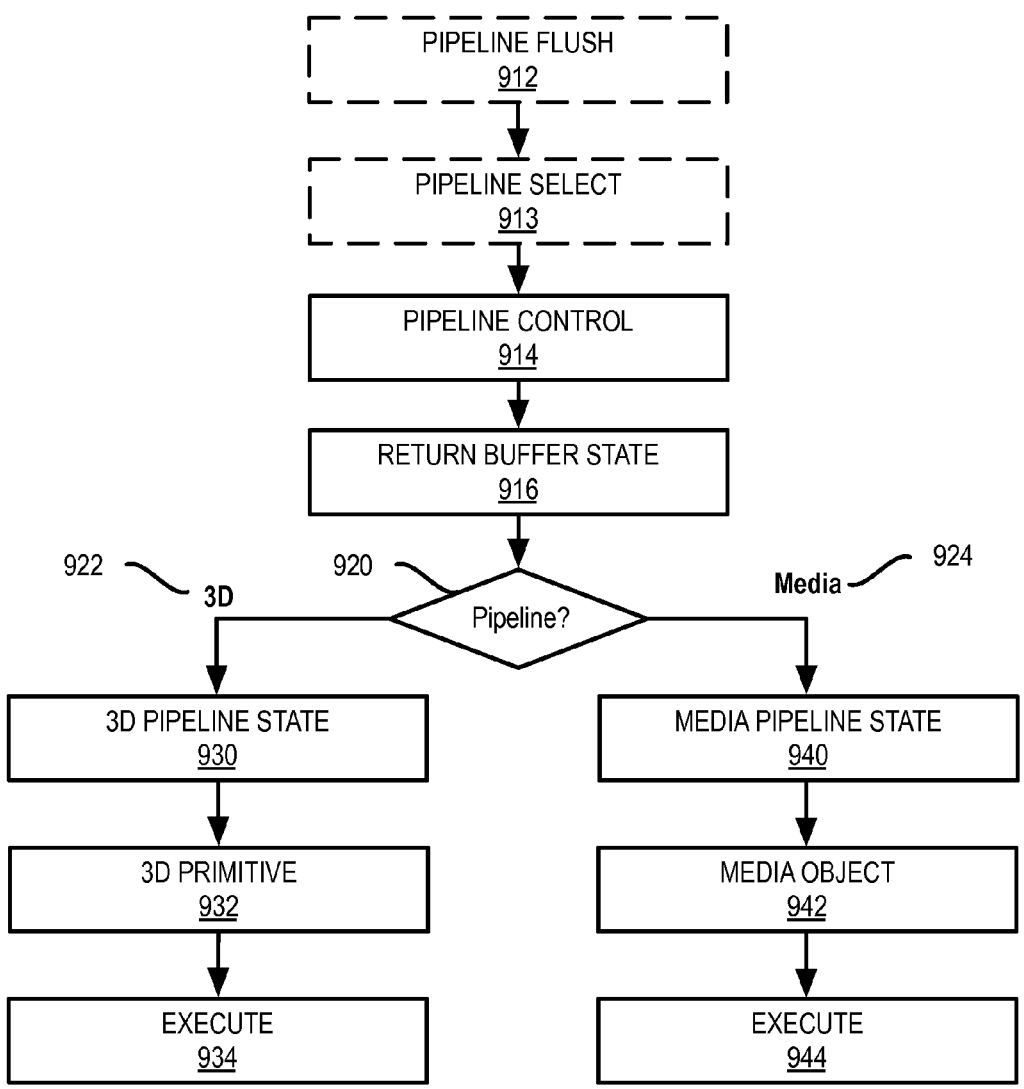
FIG. 9B is a block diagram illustrating a graphics processor command sequence according to an embodiment.

Graphics Pipeline Programming—FIG. 9A-B

FIG. 9A is a block diagram illustrating a graphics processor command format according to an embodiment and FIG. 9B is a block diagram illustrating a graphics processor command sequence according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

The client 902 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in the data 906 field of the command. For some commands an explicit command size 908 is expected to specify the size of the command. In one embodiment, the command parser automatically determines the size of at least some of the commands based on the command opcode. In one embodiment commands are aligned via multiples of a double word.

The flow chart in FIG. 9B shows a sample command sequence 910. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 910 may begin with a pipeline flush command 912 to cause any active graphics pipeline to complete the currently pending commands for the pipeline. In one embodiment, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 912 can be used for pipeline synchronization or before placing the graphics processor into a low power state.

A pipeline select command 913 is used when a command sequence requires the graphics processor to explicitly switch between pipelines. A pipeline select command 913 is required only once within an execution context before issuing pipeline commands unless the context is to issue commands for both pipelines. In one embodiment, a pipeline flush command is 912 is required immediately before a pipeline switch via the pipeline select command 913.

A pipeline control command 914 configures a graphics pipeline for operation and is used to program the 3D pipeline 922 and the media pipeline 924. The pipeline control command 914 configures the pipeline state for the active pipeline. In one embodiment, the pipeline control command 914 is used for pipeline synchronization and to clear data from one or more cache memories within the active pipeline before processing a batch of commands.

Return buffer state commands 916 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 930 commands are also able to selectively disable or bypass certain pipeline elements if those elements will not be used.

The 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. The 3D primitive 932 command is used to perform vertex operations on 3D primitives via vertex shaders. To process vertex shaders, the 3D pipeline 922 dispatches shader execution threads to graphics processor execution units.

The 3D pipeline 922 is triggered via an execute 934 command or event. In one embodiment a register write triggers command execution. In one embodiment execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. The media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 924 is configured in a similar manner as the 3D pipeline 922. A set of media pipeline state commands 940 are dispatched or placed into in a command queue before the media object commands 942. The media pipeline state commands 940 include data to configure the media pipeline elements that will be used to process the media objects. This includes data to configure the video decode and video encode logic within the media pipeline, such as encode or decode format. The media pipeline state commands 940 also support the use one or more pointers to "indirect" state elements that contain a batch of state settings.

Media object commands 942 supply pointers to media objects for processing by the media pipeline. The media objects include memory buffers containing video data to be processed. In one embodiment, all media pipeline state must be valid before issuing a media object command 942. Once the pipeline state is configured and media object commands 942 are queued, the media pipeline 924 is triggered via an execute 934 command or an equivalent execute event (e.g., register write). Output from the media pipeline 924 may then be post processed by operations provided by the 3D pipeline 922 or the media pipeline 924. In one embodiment, GPGPU operations are configured and executed in a similar manner as media operations.

Figure 10:
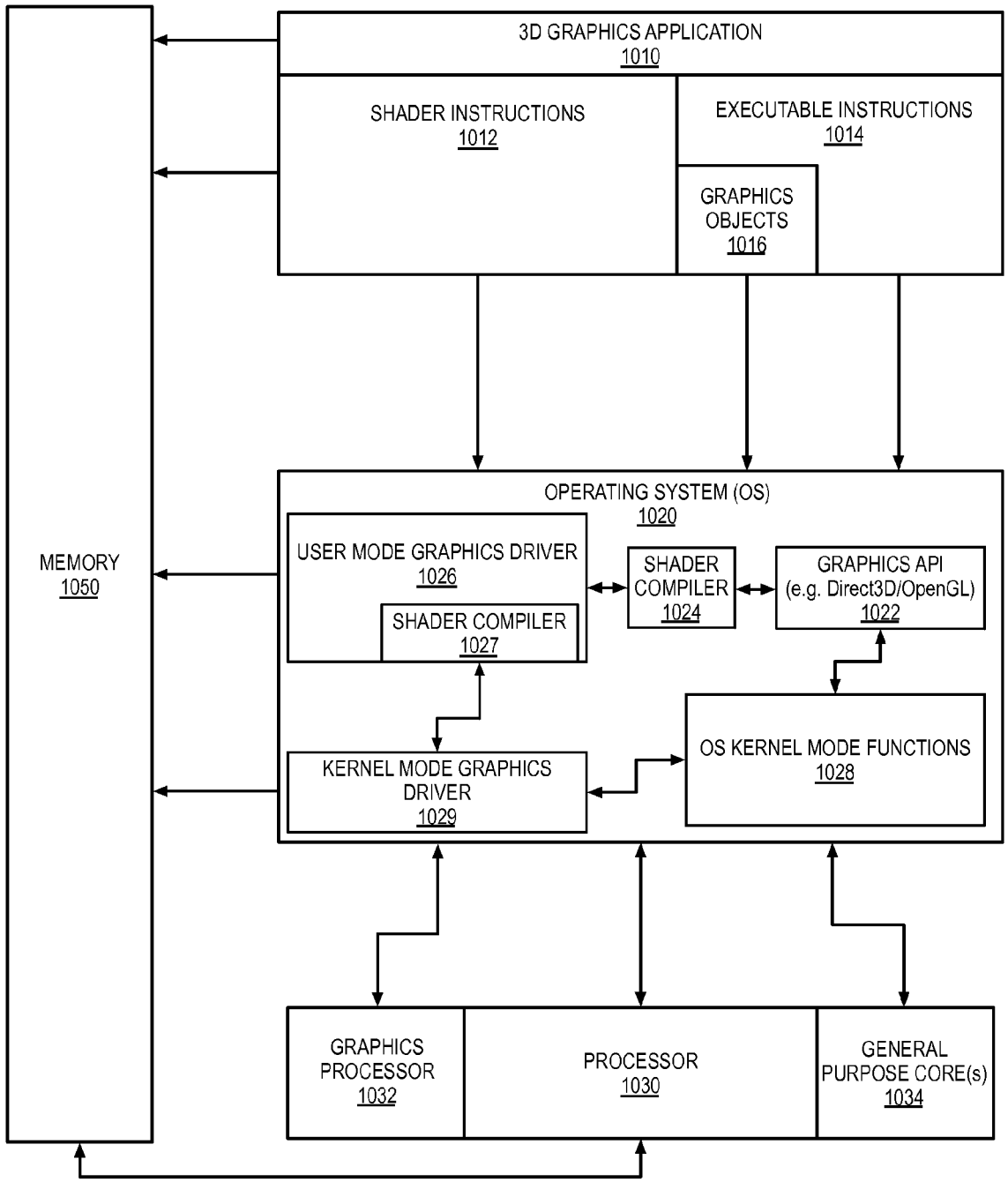
FIG. 10 illustrates exemplary graphics software architecture for a data processing system according to an embodiment.

Graphics Software Architecture—FIG. 10

FIG. 10 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

Apparatus and Method for SIMD Structured Branching

One embodiment of the invention performs SIMD control flow in hardware, thereby increasing performance and reducing power. In particular, a SIMD processor functional unit is described that can be used in SIMD threads where channels diverge and re-converge using structured flow. One example of channel divergence is an IF/ELSE/ENDIF sequence where, if the "IF" condition is met, the instruction stream diverges to a first instruction sequence, but if the "IF" condition is not met, the instruction stream diverges to a second instruction sequence (specified by the "ELSE" condition). Channel convergence occurs in response to the ENDIF statement (e.g., when all divergent instructions required by the "IF" and/or "ELSE" statements have been completed).

In one embodiment of the invention, channel divergence and convergence are detected by a new branch unit (e.g., via new instructions) which responsively enables and disables each channel. The branch unit may be shared across all threads in an execution unit (EU) and may compute the result of all structured control flow instructions for all channels in the processor.

One embodiment of the branch unit computes a channel mask, one bit per channel, to enable or disable channels during structured control flow processing. This removes the necessity to compare channel IPs for every instruction. In one embodiment, the channel mask is used as-is for all non-control flow instructions, which are processed by another unit.

In one embodiment, the channel enable mask is generated from a counter per channel which indicates if the channel is disabled, and if so, by what control flow instruction (i.e., IF/ELSE/ENDIF, CALL/RETURN, etc). This saves gates when compared with existing per-channel IP solution and saves compute cycles per instruction. The embodiments of the invention may be implemented with any structured control flow instructions supported by a standard (e.g., c/c++). This includes, by way of example and not limitation: IF/ELSE/ENDIF, DO/BREAK/CONTINUE/WHILE, CALL/RETURN, HALT, BRANCH, and may work with any other structured control flow instructions.

Recursion is also supported in one embodiment using a counter that differentiates occurrences of control flow instructions. In particular, in one embodiment, a "Control Instruction Count" is maintained for each branching type (IF/ELSE/ENDIF, DO/BREAK/CONTINUE/WHILE, CALL/RETURN, etc), which provides a count of the current level of nesting of that branching type. For example, a value of 2 for an IF branching type means two nested IF statements. In one embodiment, the Control Instruction Count is zero if the current IP is outside of any branching conditional blocks.

One embodiment also maintains a "Per Channel Count" to determine if a channel is enabled. If the Per Channel Count is 0, the channel is enabled. In one embodiment, when a channel is disabled, its corresponding count contains the value of the Control Instruction Count at which the channel was disabled along with an encoded ID representing the branching type. (e.g., IF, 2 for an IF branching type with 2 nested IF statements).

In one embodiment, an n-channel entry stack is used to store the address (IP) of converging instructions (e.g., for an IF instruction, the IP of the ENDIF instruction is stored). A Top of Stack pointer is maintained for each branching type to identify the IP for the converging instruction within the stack.

In addition, in one embodiment, each instruction contains a predicate mask. Each bit of the predicate mask represents one channel, and is used to determine if the channel takes the conditional or not. (e.g., for IF, a channel can either enter the IF block, or jump to the ELSE block). In one embodiment, only enabled channels are evaluated for execution.

Figure 11:
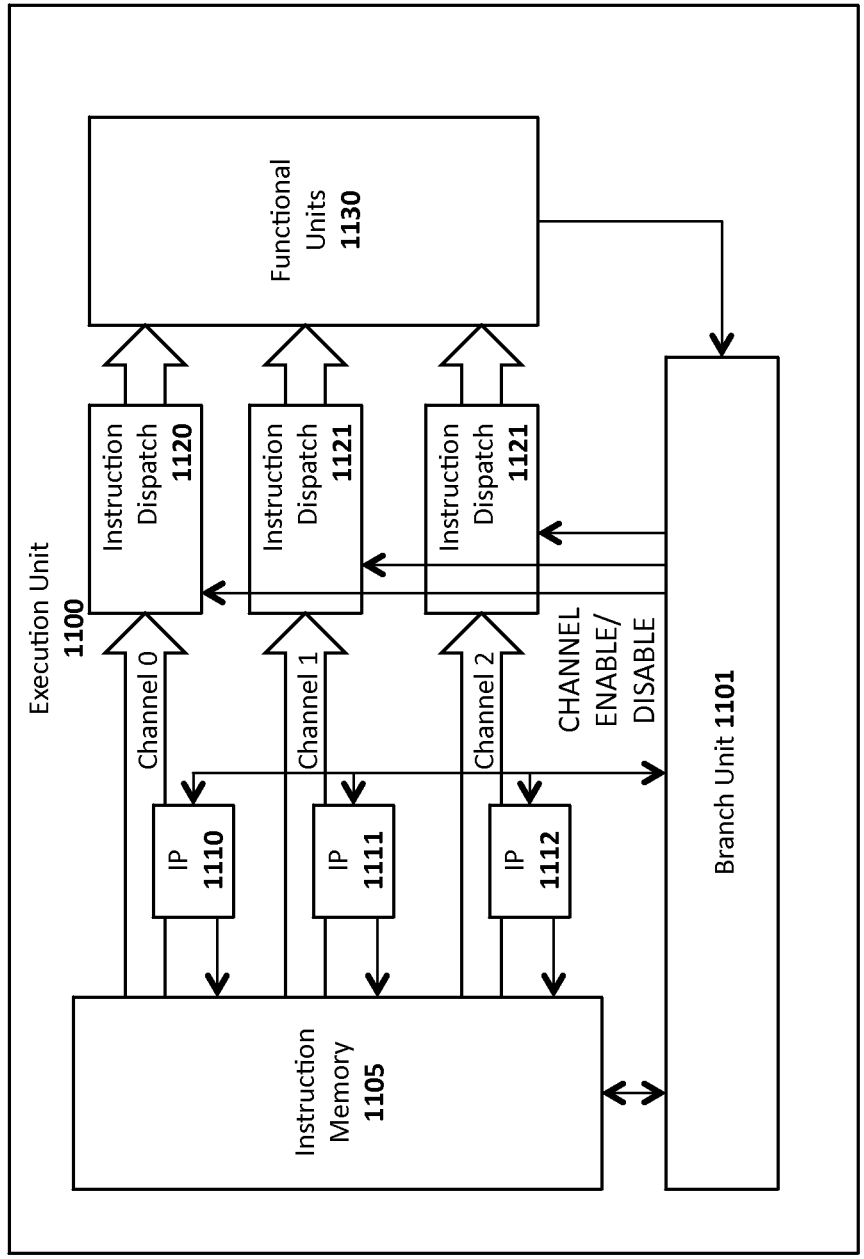
FIG. 11 illustrates one embodiment of a system architecture for performing SIMD branch operations.

FIG. 11 illustrates an architecture for an execution unit 1100 in which a branch unit 1101 is implemented in accordance with one embodiment of the invention. A plurality of channels 0-2 execute instructions stored in an instruction memory 1105 which may be an instruction buffer, instruction cache or any other memory suitable for storing instructions prior to execution. While 3 channels are illustrated in FIG. 11, the underlying principles of the invention may be implemented with any number of channels. An instruction pointer 1110-1112 associated with each channel 0-2, respectively, identifies the next instruction to be executed over its respective channel. Instruction dispatch logic 1120-1122 then dispatches the instructions for execution on a plurality of functional units 1130, which may include, for example, vector functional units, scalar functional units, and logical functional units (and/or any other type of functional unit designed to execute the instructions).

The execution unit 1100 shown in FIG. 11 may be implemented within a graphics processing unit architecture such as described above (see, e.g., execution units 608 shown in FIG. 6). However, the underlying principles of the invention are not limited to a graphics processing implementation.

As mentioned above, channel divergence and convergence are detected by the branch unit 1101 which responsively enables and disables each channel. The branch unit 1101 may be shared across all threads in the EU 1100 and may compute the result of all structured control flow instructions for all channels in the processor. In one embodiment, each thread is executed on a different channel 0-2.

Figure 12:
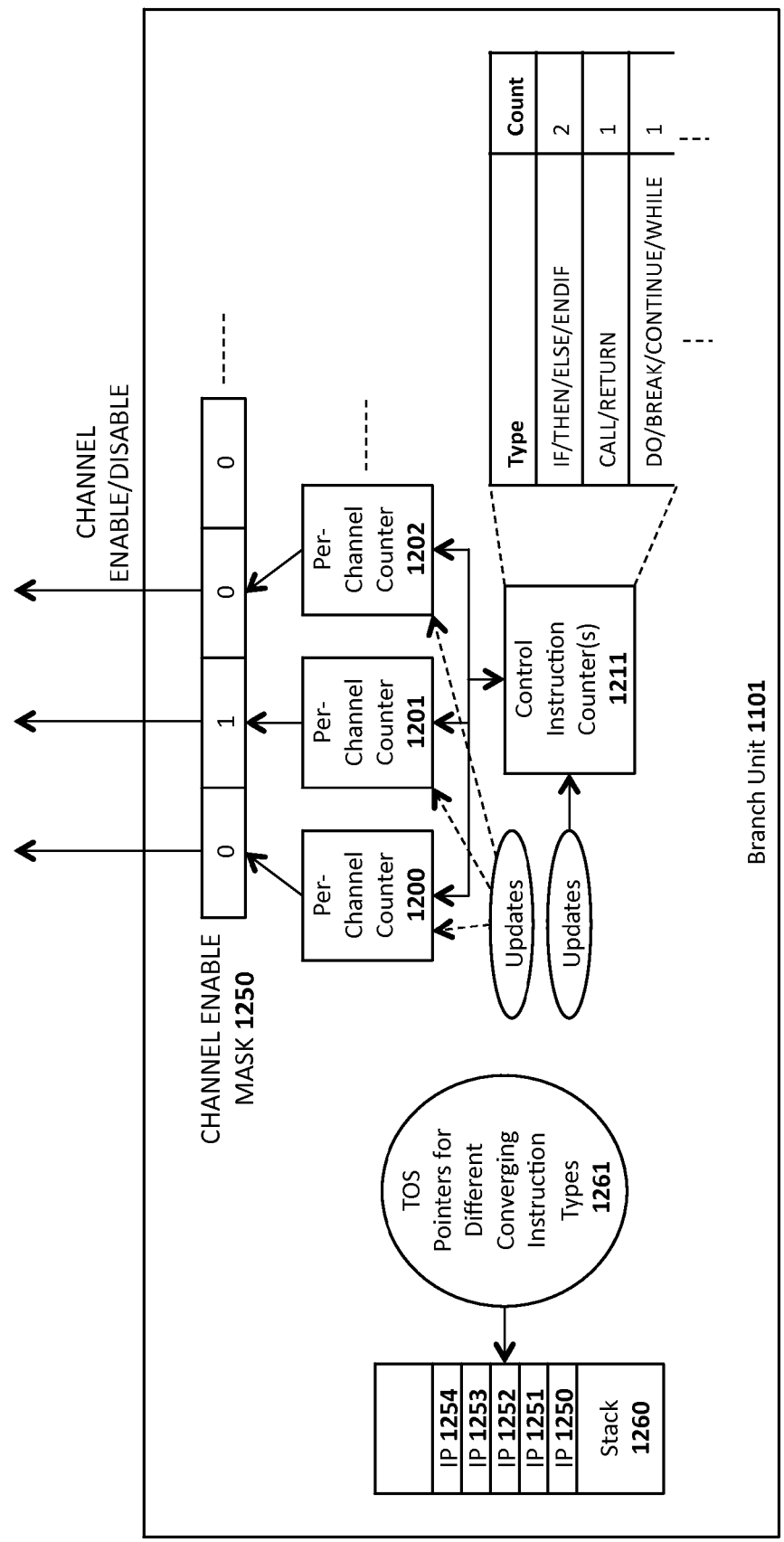
FIG. 12 illustrates a branch unit in accordance with one embodiment of the invention.

FIG. 12 illustrates additional details associated with one embodiment of the branch unit 1101. As illustrated, this embodiment of the branch unit 1101 computes a channel enable mask 1250, one bit per channel, to enable or disable channels during structured control flow processing (thereby removing the necessity to compare channel IPs for every instruction). In one embodiment, the channel mask 1250 is used as-is for all non-control flow instructions, which are processed by another unit.

In one embodiment, the channel enable mask 1250 is generated from a set of per-channel counters 1200-1202 which indicate whether the channel is disabled, and if so, by what control flow instruction (i.e., IF/ELSE/ENDIF, CALL/RETURN, etc). A set of control instruction counters 1211 differentiates occurrences of control flow instructions with a "control instruction count" maintained for each branching type (IF/ELSE/ENDIF, DO/BREAK/CONTINUE/WHILE, CALL/RETURN, etc). In one embodiment, the control instruction count indicates the current level of nesting of that branching type. In the example shown in FIG. 12, a value of 2 is shown for an IF branching type, meaning two nested IF statements. Values of 1 are shown for CALL/RETURN and DO/BREAK/CONTINUE/WHILE instructions indicating 1 level of nesting. In one embodiment, the control instruction count is zero if the current IP is outside of any branching conditional blocks.

In one embodiment, if the per channel count is 0 in a per-channel counter 1200-1202, then the corresponding channel is enabled, as indicated by a 0 in the channel mask 1250. In one embodiment, when a channel is disabled, its corresponding count in its per-channel counter 1200-1202 comprises the control instruction count at which the channel was disabled along with the encoded ID representing the branching type (provided by the control instruction counters 1211).

FIG. 12 also illustrates an n-channel entry stack 1260 used to store the address (IP) of converging instructions (e.g., for an IF instruction, the IP of the ENDIF instruction is stored). Top of stack pointers 1261 are maintained for each branching type to identify the IP 1250-1254 for the converging instruction within the stack 1260. In one embodiment, the IP of the converging instruction is added to the stack when executing the corresponding diverging instruction.

As mentioned, in one embodiment, each instruction contains a predicate mask where each bit represents one channel, and is used to determine if the channel takes the conditional or not (e.g., for IF, a channel can either enter the IF block, or jump to the ELSE block). In one embodiment, only enabled channels are evaluated for execution.

Figure 13:
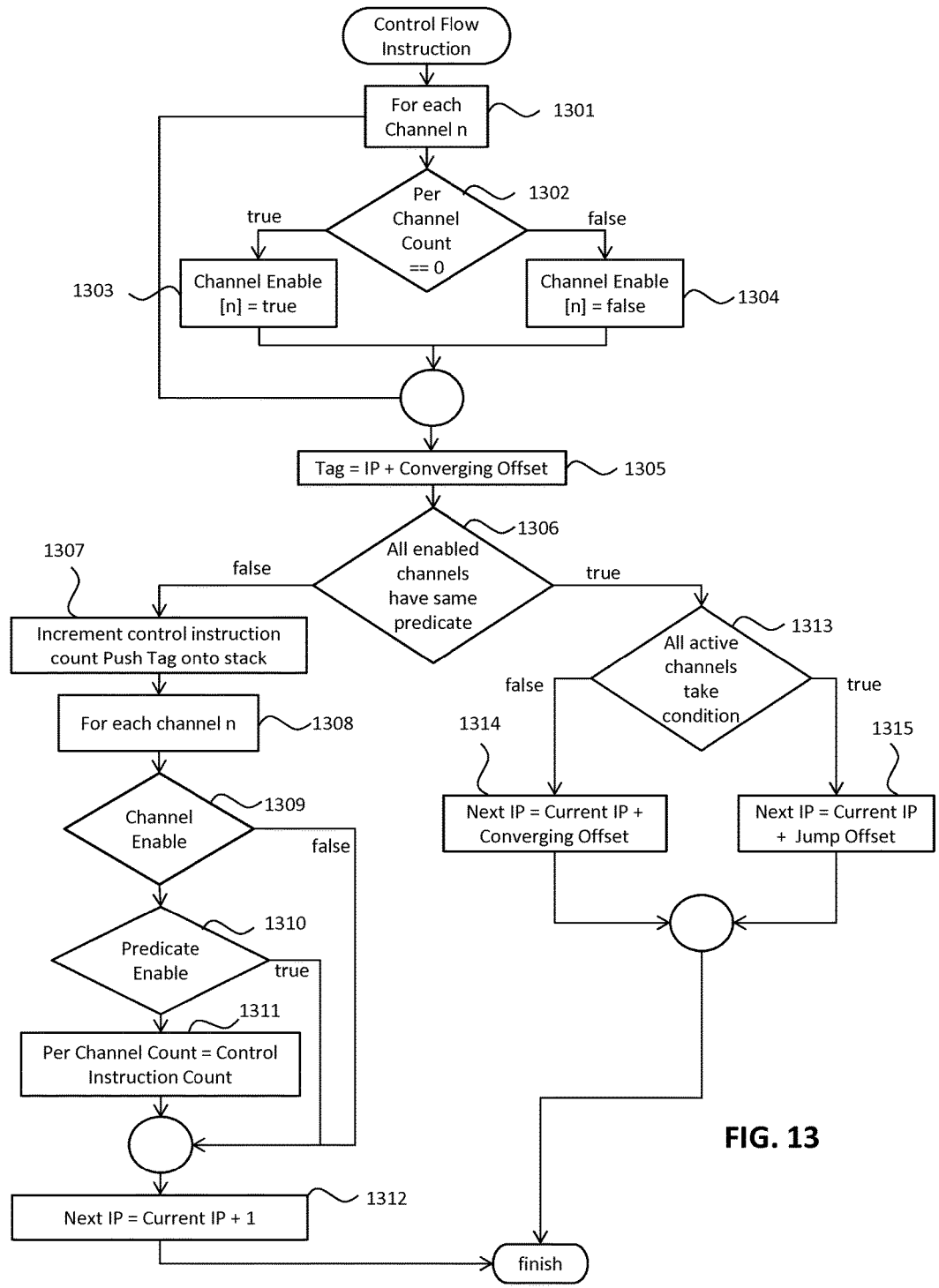
FIG. 13 illustrates a method for processing diverging control flow instructions in accordance with one embodiment of the invention.

A method for executing diverging instructions is set forth in FIG. 13. The method may be implemented within the context of the system shown in FIGS. 11-12 but is not limited to any particular system architecture.

Starting at 1301, for each channel n, a determination is made at 1302 as to whether the per channel count is 0. As mentioned, in one embodiment, a channel count of 0 indicates that the corresponding channel is enabled, determined at 1303. If the per channel count is non-zero, the corresponding channel is not enabled, determined at 1304. The above process is performed for each channel n.

At 1305 a tag for the converging IP is set equal to the current IP+the converging offset (i.e., the distance from the current IP to the converging IP). At 1306, a determination is made as to whether all enabled channels have the same predicate value associated therewith (e.g., whether the predicate mask of the instructions are the same). If not, then at 1307, the control instruction count is incremented for the current control flow instruction type (e.g., the IF count is incremented within the corresponding control instruction counter 1211).

At 1308, for each channel n, a determination is made as to whether the channel is enabled at 1309. If so, then at 1310 a determination is made as to whether the channel is enabled for the current instruction based on the predicate enable field. If not, then the per channel count is set equal to the control instruction count for the control flow instruction at 1311 (thereby disabling the channel). The above process is repeated for each channel n. At 1312, the next instruction pointer is incremented (e.g., the next instruction pointer is set equal to the current instruction pointer+1).

Turning back to decision block 1306, if all enabled channels have the same predicate value associated therewith (i.e., the predicate mask of the instructions are the same), then at 1313, a determination is made as to whether all active channels take the current condition (e.g., whether all channels can process the control flow instruction). If so, then at 1315 the next instruction pointer is set equal to the current instruction pointer added to the jump offset (i.e., the IP location of the diverging instruction). If not, then at 1314 the next instruction pointer is set equal to the current instruction pointer added to the converging offset (i.e., the location of the converging instruction).

As a result of the foregoing method, if the predicate is uniform for all channels, then the per channel count is not updated, and only the Execution IP is updated. If the predicate mask is not uniform for all channels, this is called divergence and, in this case, some channels take the condition and some do not. In this instance, the control instruction count is incremented, and the per channel count of each channel which does not take the condition is updated with the control instruction count of the current branching type. The Tag is pushed onto the stack (to store the IP of the converging instruction), and the top of stack pointer is updated.

Figure 14:
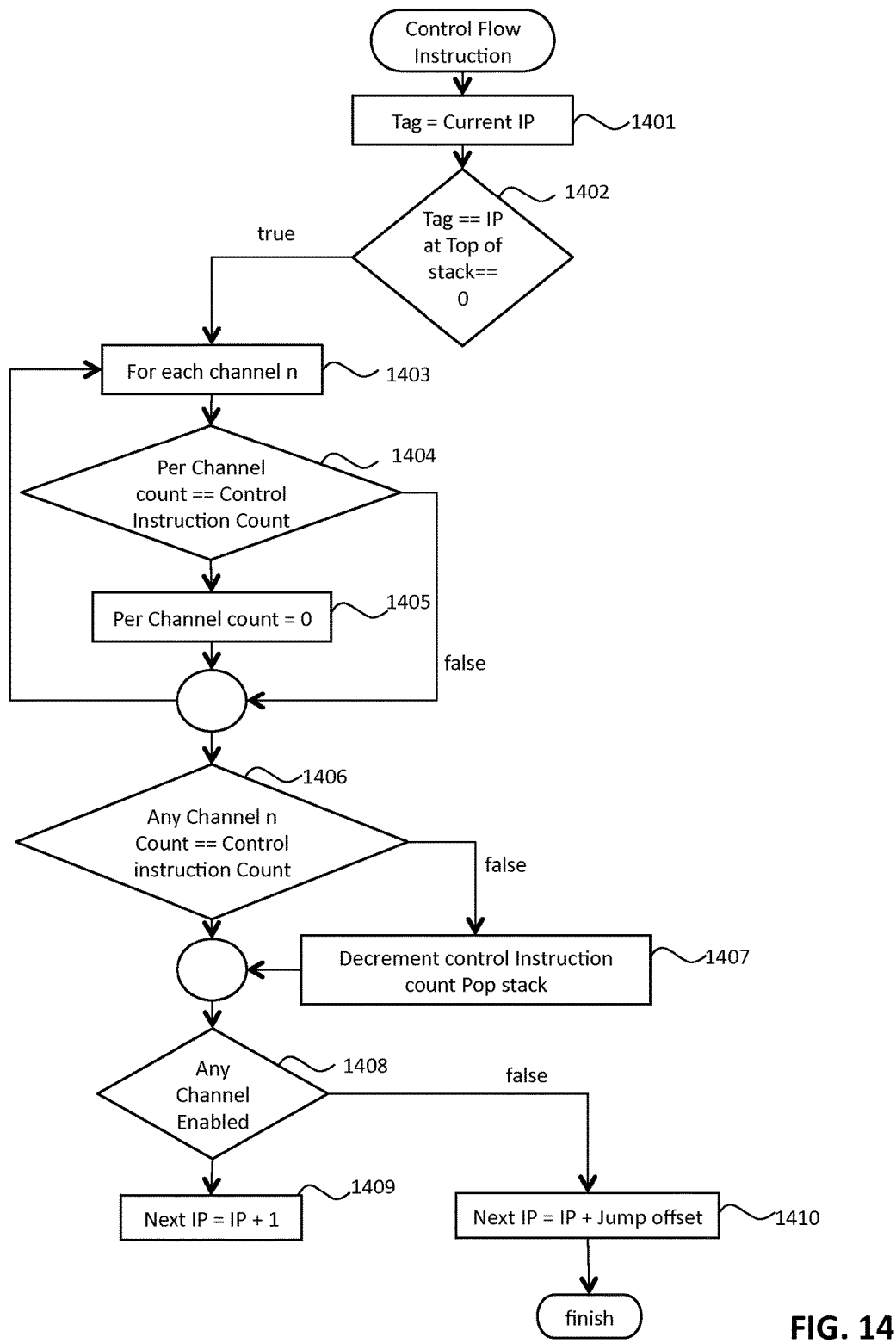
FIG. 14 illustrates a method for processing converging control flow instructions in accordance with one embodiment of the invention.

FIG. 14 illustrates one embodiment of a method for processing converging control flow instructions. The method may be implemented within the context of the processor architecture shown in FIGS. 11-12 but is not limited to any particular architecture.

At 1401, a tag is set equal to the current instruction pointer. At 1402, if the tag is equal to the instruction pointer at the top of the stack (e.g., stack 1260), then the process moves to 1403. For each channel n, if the per channel count is equal to the control instruction count, determined at 1404, then the per channel count is set equal to 0 at 1405 (enabling the channel).

Once the process completes for each channel, at 1406 a determination is made as to whether any channel count is equal to the control instruction count. If not, then at 1407, the control instruction count is decremented and the instruction pointer is popped from the stack. At 1408 a determination is made as to whether any channel is enabled. If so, then at 1409 the instruction pointer is incremented (i.e., the next instruction pointer is set to the current instruction pointer+1). If not, then at 1410, the next instruction pointer is set equal to the current instruction pointer added to the jump offset (i.e., to arrive at the IP for the divergent control flow instruction).

As a result of the foregoing method, the current IP is compared to the Top of Stack IP. If those values match, then each per channel count is compared to the branching type's control instruction count, for channels with an enabled predicate mask bit. If these values match, the per channel count is set to 0 (indicating an active channel). If all channels are enabled corresponding to a particular control instruction count, then the count is decremented and the stack is popped. The IP is incremented and the program continues as normal.

Apparatus and Method for Unstructured Control Flow for a SIMD Execution Engine

As mentioned above, unstructured control flow is not currently supported in hardware for SIMD programs. Modern compilers produce unstructured SIMD program code which is traditionally converted back to structured program code by the compiler, and some optimizations are lost due to converting back to structured flow.

To address this limitation, one embodiment of the invention supports unstructured control flow instructions for SIMD programs in hardware, thereby maintaining the compiler optimizations which improves performance and reduces power. In particular, a branch unit may be equipped with logic to implement both the structured branching embodiments (described above) and unstructured branching embodiments (described below). It should be noted, however, that the structured branching techniques described above are not required for implementing the unstructured branching techniques described below (i.e., the unstructured branching techniques may be implemented in a branch unit with or without the structured branching techniques).

Figure 15:
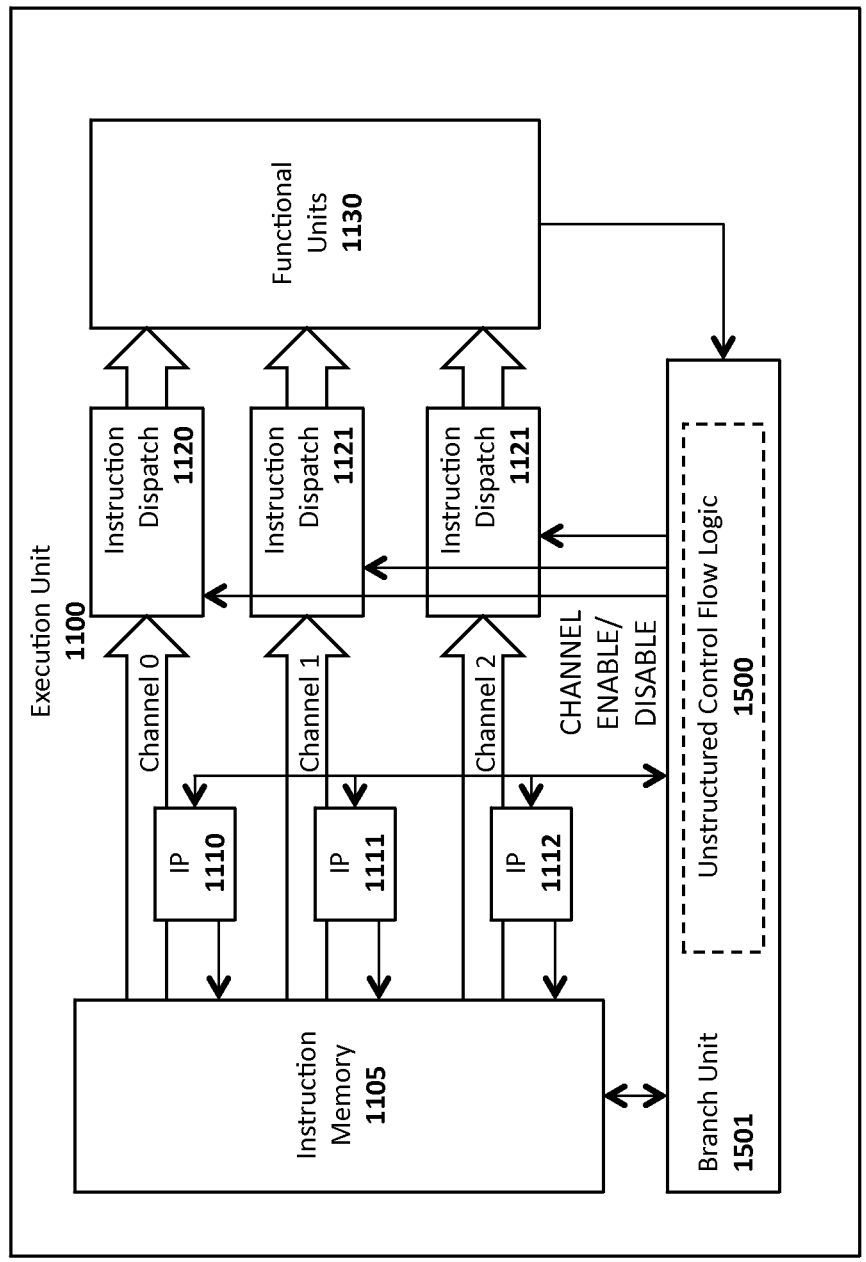
FIG. 15 illustrates one embodiment of a branch unit with unstructured control flow logic.

As illustrated in FIG. 15, in one embodiment, the branch unit 1501 includes unstructured control flow logic 1500 to support new unstructured control flow instructions. The unstructured control flow logic 1500 may be used in SIMD threads where channels diverge and re-converge using unstructured control flow. Channel divergence and convergence is may be detected from new instructions and the branch unit 1501 manages enables for each channel as described below.

As in the structured control flow embodiments, a plurality of channels 0-2 execute instructions stored in an instruction memory 1105 which may be an instruction buffer, instruction cache or any other memory suitable for storing instructions prior to execution. While three channels are illustrated in FIG. 15, the underlying principles of the invention may be implemented with any number of channels. An instruction pointer 1110-1112 associated with each channel 0-2, respectively, identifies the next instruction to be executed over its respective channel. Instruction dispatch logic 1120-1122 then dispatches the instructions for execution on a plurality of functional units 1130, which may include, for example, vector functional units, scalar functional units, and logical functional units (and/or any other type of functional unit designed to execute the instructions). The execution unit 1100 shown in FIG. 15 may be implemented within a graphics processing unit architecture such as described above (see, e.g., execution units 608 shown in FIG. 6). However, the underlying principles of the invention are not limited to a graphics processing implementation.

As mentioned above, channel divergence and convergence are detected by the branch unit 1101 which responsively enables and disables each channel. The branch unit 1101 may be shared across all threads in the EU 1100 and may compute the result of all unstructured control flow instructions for all channels in the processor. In one embodiment, each thread is executed on a different channel 0-2.

Figure 16:
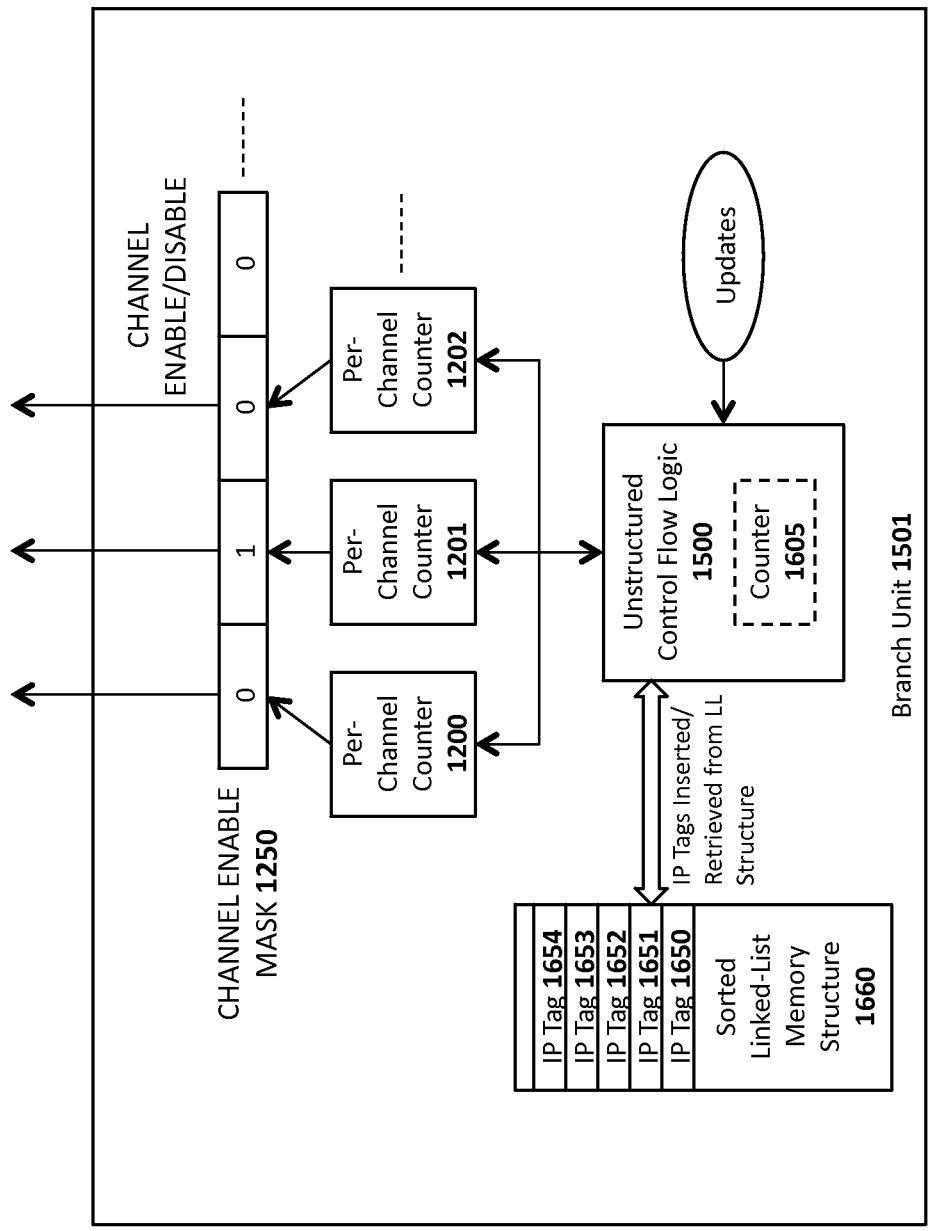
FIG. 16 illustrates additional details of one embodiment of the branch unit.

FIG. 16 provides additional details for implementing unstructured control flow including a channel mask 1250 to enable and disable channels. The channel mask 1250 may be computed for both structured and unstructured control flow instructions by the branch unit 1501 and may be used as-is for all non-control flow instructions, which are processed by another unit. In one embodiment, two new instructions are added for unstructured control flow, GOTO and JOIN, and a new counter 1605 is added to process these new instructions. In one embodiment, GOTO causes a jump to a specified location in the instruction stream and JOIN returns to a specified location in the instruction stream (e.g., both specified via an address/instruction pointer).

In the embodiments described above related to SIMD structured branching, the branch unit 1501 has defined a Control Instruction Count per branching type (e.g., IF/THEN/ENDIF, BREAK/WHILE/CONTINUE, CALL/RETURN, etc), which is a count of the current level of nesting of that branching type. In one embodiment, this mechanism is modified to handle unstructured instructions. Instead of using a count as the unique identifier, this embodiment uses the address of the IP tag in the local memory. While the unstructured instructions used a stack structure 1260 shown in FIG. 12 (top of stack being the last address pushed onto the stack), the new unstructured instructions use a sorted linked-list structure 1660 to store IP tags 1650-1654 in the same memory space as shown in FIG. 16. One difference with the stack structure 1260 is that in the sorted linked-list structure 1660 the unstructured instruction IP tags 1650-1654 are sorted by hardware (while in the stack structure the structured IPs are sorted by definition).

The existing Per Channel Count maintained in per channel counters 1200-1202 is used to determine if a channel is enabled. If the Per Channel Count is 0, the channel is enabled. In one embodiment, when a channel is disabled by an unstructured instruction its corresponding count is updated to contain the address of the IP tag 1650-1654 at which the channel was disabled along with an encoded ID representing the branching type (e.g., "GOTO2" to identify the GOTO instruction and IP tag at entry #2 in the linked list memory 1660 structure 1660).

As in the prior embodiments, each instruction may include a predicate mask. Each bit in the predicate mask represents one channel, and is used by the unstructured control flow logic 1500 of the branch unit 1501 to determine if the channel takes the conditional or not. Only enabled channels are evaluated for execution.

Figure 17:
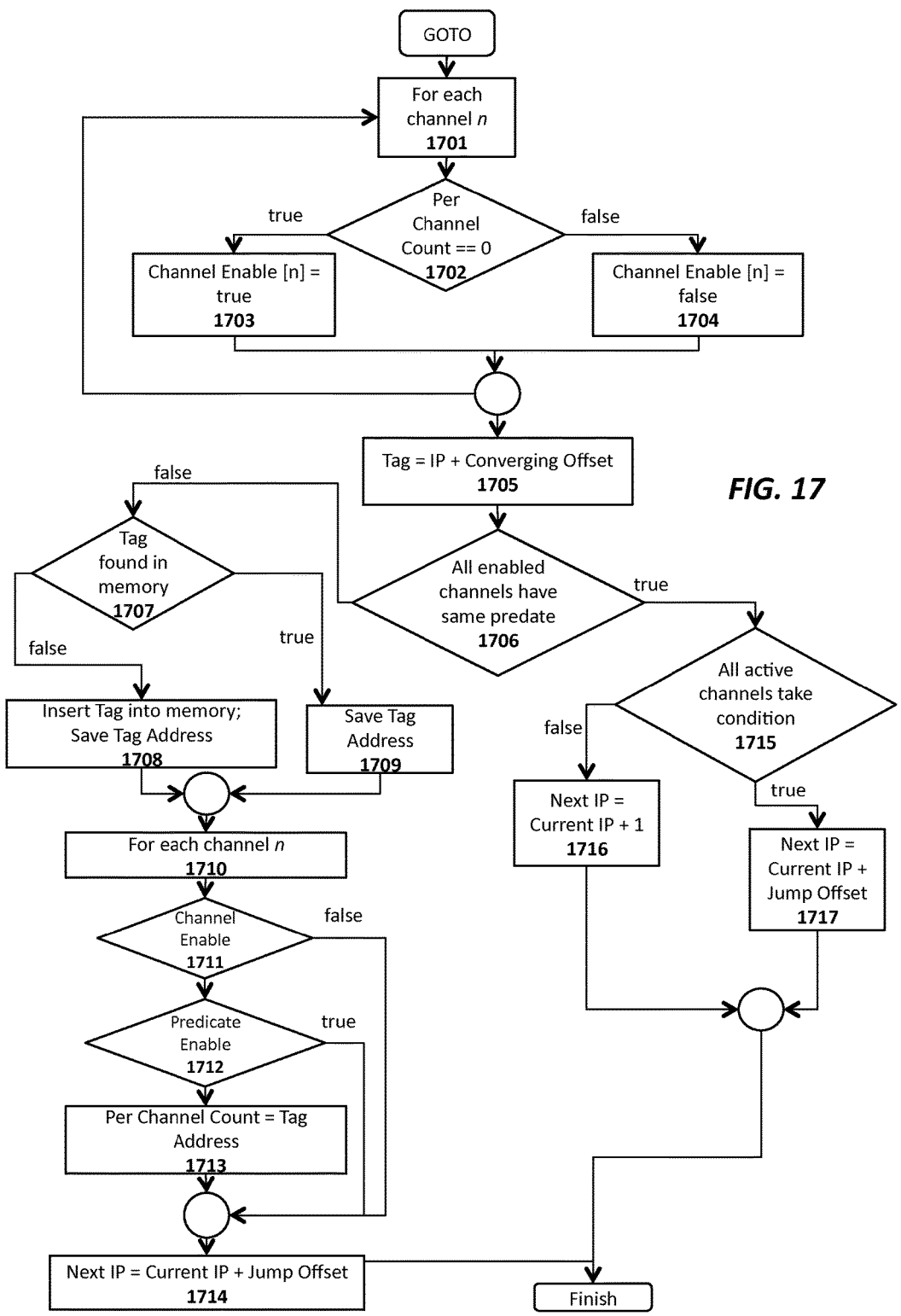
FIG. 17 illustrates a method for processing unstructured diverging control flow instructions in accordance with one embodiment of the invention.

One embodiment of a method for executing unstructured diverging instructions is set forth in FIG. 17. The method may be implemented within the context of the system shown in FIGS. 15-16 but is not limited to any particular system architecture.

Starting at 1701, for each channel n, a determination is made at 1702 as to whether the per channel count is 0. As mentioned, in one embodiment, a channel count of 0 indicates that the corresponding channel is enabled, determined at 1703. If the per channel count is non-zero, the corresponding channel is not enabled, determined at 1704. The above process is performed for each channel n.

At 1705 a tag for the converging IP is set equal to the current IP+the converging offset (i.e., the distance from the current IP to the IP of the converging instruction). At 1706, a determination is made as to whether all enabled channels have the same predicate value associated therewith (e.g., whether the predicate mask of the instructions are the same). If not, then at 1707, the sorted linked list memory structure (e.g., 1660 in FIG. 16) is searched to determine whether the IP tag is found in the memory. If not, then at 1708, the tag is inserted into the memory and the tag address is saved (e.g., into a temporary storage such as counter 1606 accessible by the unstructured control flow logic 1500). If the IP tag is found in the memory, then at 1709 the tag address is saved.

Starting at 1710, for each channel n, a determination is made as to whether the channel is enabled at 1711. If so, then at 1712 a determination is made as to whether the channel is enabled for the current instruction based on the predicate enable field of the instruction. If not, then the per channel count is set equal to the tag address (identifying the IP tag within the memory 1660). In one embodiment, the tag address is stored in the corresponding Per Channel Counter 1200-1202 for the current channel n (thereby disabling the channel). The above process is repeated for each channel n. At 1714, the next instruction pointer is set by adding the jump offset to the current instruction pointer (i.e., to arrive at the IP address of the diverging instruction).

Turning back to decision block 1706, if all enabled channels have the same predicate value associated therewith (i.e., the predicate mask of the instructions are the same), then at 1715, a determination is made as to whether all active channels take the current condition (e.g., whether all channels can process the control flow instruction). If so, then at 1717 the next instruction pointer is set equal to the current instruction pointer added to the jump offset (i.e., the IP location of the diverging instruction). If not, then at 1716 the instruction pointer is incremented, i.e., the next instruction pointer is set equal to the current instruction pointer+1 (i.e., the diverging instruction is not taken).

As a result of the foregoing method, if the predicate is uniform for all channels, then the per channel count is not updated, and only the Execution IP is updated. If the predicate mask is not uniform for all channels, this is called divergence and, in this case, some channels take the condition and some do not. In this instance, the control instruction count is incremented, and the per channel count of each channel which does not take the condition is updated with the memory address of the converging IP. The IP Tag 1650-1654 is inserted into memory 1660.

Figure 18:
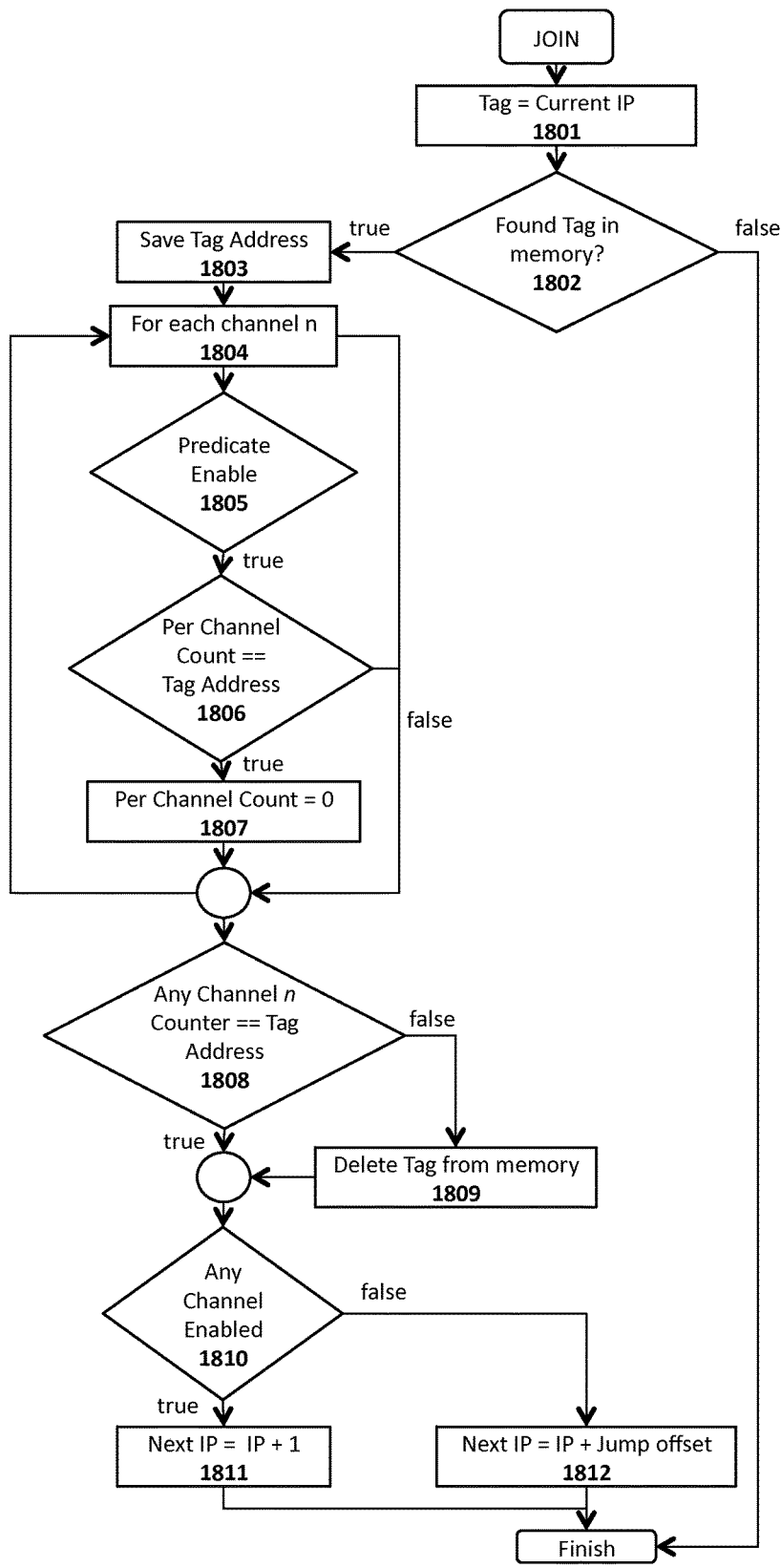
FIG. 18 illustrates a method for processing unstructured converging control flow instructions in accordance with one embodiment of the invention.

FIG. 18 illustrates one embodiment of a method for processing unstructured converging instructions. The method may be implemented within the context of the processor architecture shown in FIGS. 15-16 but is not limited to any particular architecture.

At 1801, the tag is set equal to the current instruction pointer. At 1802, the memory containing IP tags (e.g., sorted linked-list memory 1660) is searched using the tag. If a match is found, then the tag address is saved at 1803 (e.g., into a temporary storage such as a counter 1606 accessible by the unstructured control flow logic). At 1804, for each channel n, if the predicate enable bit is set (determined at 1805) and the per channel count is equal to the tag address (determined at 1806), then the per channel count is set equal to 0 at 1807 (thereby enabling the channel).

Once the process completes for each channel, at 1808 a determination is made as to whether any channel count is equal to the tag address. If not, then at 1809, the IP tag is deleted from memory. At 1810 a determination is made as to whether any channel is enabled. If so, then at 1811 the instruction pointer is incremented (i.e., the next instruction pointer is set to the current instruction pointer+1). If not, then at 1812 the next instruction pointer is set equal to the current instruction pointer added to the jump offset (i.e., to arrive at the IP for the next unstructured instruction).

As a result of the foregoing method, the current IP is searched for in memory. If it is found, then each Per Channel Count is compared to the memory address for channels with an enabled predicate mask bit. If these values match, the Per Channel Count is set to 0 (indicating an active channel). If all channels are enabled corresponding to a particular Control Instruction Count, then the Tag is removed from memory.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
    an execution unit having a plurality of channels to execute instructions; and
    a branch unit to process unstructured control flow instructions and to maintain a per channel count value for each channel, the branch unit to store instruction pointer tags for the unstructured control flow instructions in a memory and identify the instruction pointer tags using tag addresses, the branch unit to further enable and disable the channels based at least on the per channel count value, and wherein the branch unit is to generate a channel enable mask to indicate whether each of the channels is enabled, the per channel mask being generated based on values stored in each of a plurality of per-channel counters, each of the per-channel counters storing the per channel count value for each respective channel, wherein upon detecting that a particular channel does not satisfy a condition of a current unstructured control flow instruction, the per-channel counter is to be updated with a tag address identifying one of the instruction pointer tags.

2. The processor as in claim 1 wherein the channel mask includes a single bit per channel, wherein a first binary value indicates that the channel is enabled and a second binary value indicates that the channel is disabled.

3. The processor as in claim 2 wherein the channel mask bits are updated in response to the per-channel count values maintained for each channel.

4. The processor as in claim 3 wherein a per channel count value of 0 indicates that the channel is enabled and wherein any other per channel count value indicates that the channel is disabled.

5. The processor as in claim 4 wherein the memory in which the instruction pointer tags are stored comprises a sorted linked-list memory structure.

6. The processor as in claim 1 wherein each unstructured control flow instruction comprises a predicate mask, the branch unit interpreting the predicate mask to determine whether each channel takes a conditional of the unstructured control flow instruction.

7. The processor as in claim 6 wherein if the predicate mask is uniform for all channels, then the per channel count value is not updated but the execution instruction pointer is updated.

8. The processor as in claim 6 wherein if the predicate mask is not uniform for all channels and if a current tag address is not found in the memory, then the current instruction pointer tag is inserted into the memory.

9. The processor as in claim 1 wherein the unstructured control flow instructions comprise diverging instructions and converging instructions.

10. The processor as in claim 9 further comprising:
    a sorted linked list memory structure used to store instruction pointers of converging instructions and/or diverging instructions.

11. The processor as in claim 10 wherein the unstructured control flow instructions include GOTO and JOIN instructions, the GOTO instruction causing a jump to a first specified location in an instruction steam and the JOIN instruction causing a return to a second specified location in the instruction stream.

12. A method comprising:
    generating a tag address associated with a current unstructured control flow instruction using at least a current instruction pointer;
    determining whether an instruction predicate mask of an unstructured control flow instruction is uniform for all channels of an execution unit, the predicate mask indicating which channels can process the unstructured control flow instruction type;

searching a memory to determine whether a stored instruction pointer tag corresponding to the tag address is stored therein, when the instruction predicate mask is not uniform for all channels; and inserting an instruction pointer tag of the unstructured control flow instruction into the memory and saving a tag address-of the instruction pointer tag, when the instruction pointer tag is not found in the memory.

13. The method as in claim 11, further comprising saving a tag address of the tag when the instruction pointer tag is found in the memory.

14. The method as in claim 12 further comprising updating a per channel count of a channel to include the tag address.

15. The method as in claim 12 wherein if the instruction predicate mask is uniform for all channels, then updating a next instruction pointer.

16. The method as in claim 15 wherein updating the next instruction pointer comprises setting the next instruction pointer equal to the sum of a current instruction pointer and a jump offset if all active channels can process the unstructured control flow instruction type.

17. The method as in claim 15 wherein updating the next instruction pointer comprises incrementing the current instruction pointer if all active channels cannot process the unstructured control flow instruction type.

18. The method as in claim 14 further comprising:
determining whether each channel is enabled or disabled and updating the per channel count only for those channels which are enabled.

19. The method as in claim 18 further comprising:
determining whether a predicate value indicates that a channel is enabled for the control flow instruction type and updating the per channel count only for those channels which the predicate indicates are not enabled for that control flow instruction type.

20. A method comprising:
comparing an instruction pointer address of a current instruction pointer of an unstructured control flow instruction to entries in a memory storing instruction pointer tags to determine whether the instruction pointer address is stored in the memory;

saving a tag address of the current instruction pointer and comparing each per channel count maintained for each channel of an execution unit with the tag address upon determining that the instruction pointer address is stored in the memory; and setting the per channel count to a first value indicating an enabled channel if the per channel count is equal to the tag address, wherein the first value comprises 0.

21. The method as in claim 20 wherein if any channel is enabled for the unstructured control flow instruction then setting a next instruction pointer by incrementing a current instruction pointer.

22. The method as in claim 20 wherein if no channel is enabled for the unstructured control flow instruction then setting a next instruction pointer equal to a current instruction pointer added to a jump offset value.

* * * * *